Jan. 5, 1954  A. M. CATALDO  2,664,637
GAUGE FOR INTERNAL UPSETS
Filed July 4, 1951  2 Sheets-Sheet 1
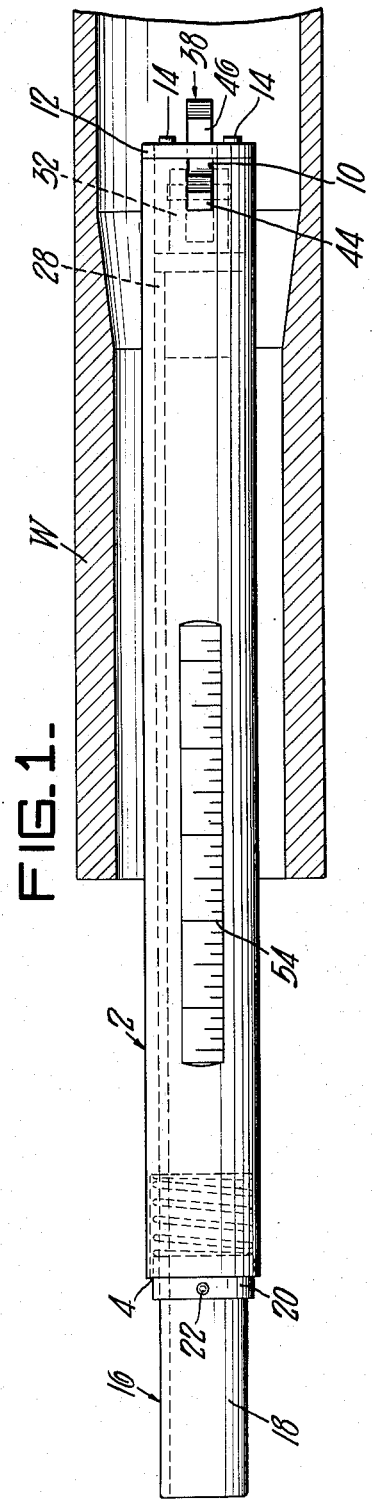
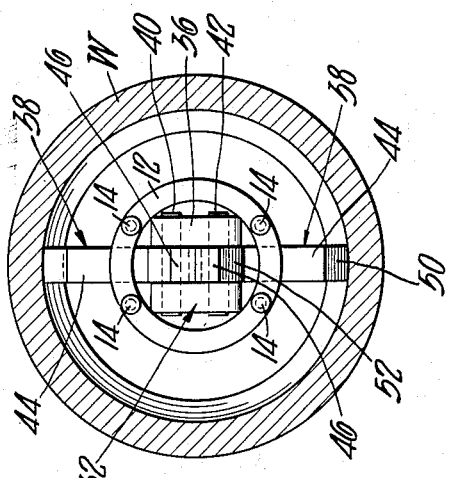
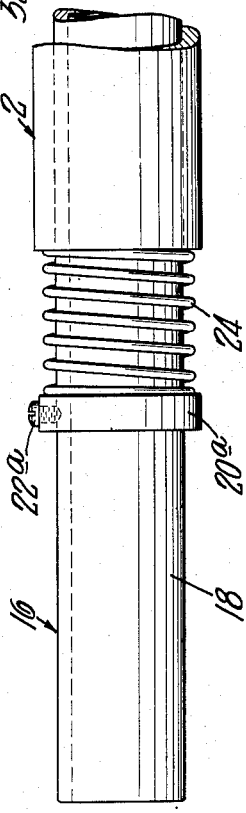
*Inventor:*
ANTHONY M. CATALDO,
by: Donald G. Dalton
his Attorney.

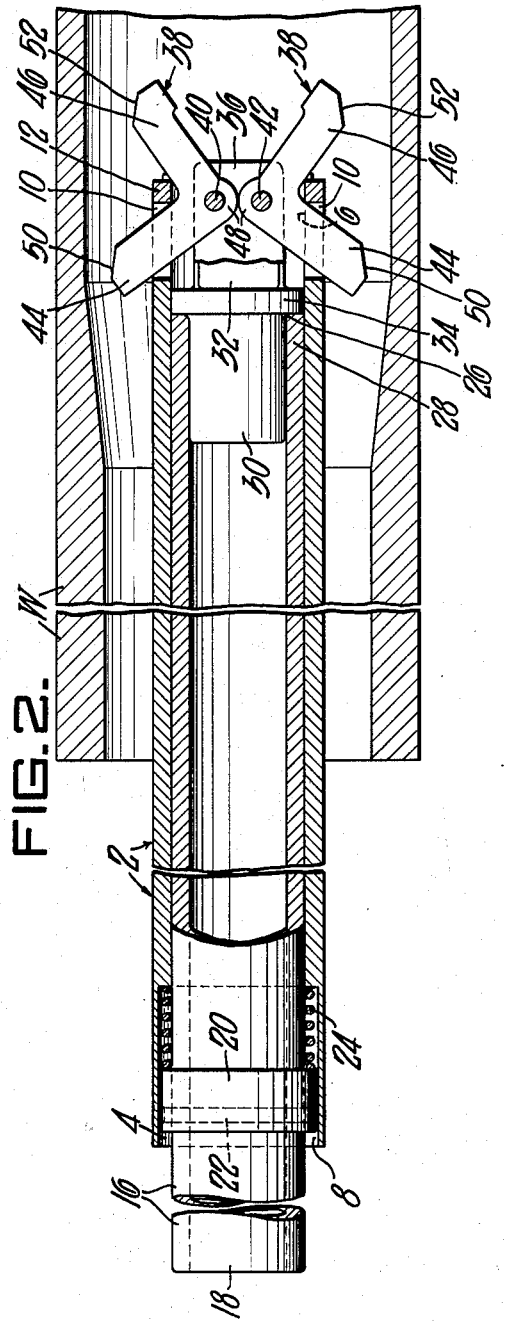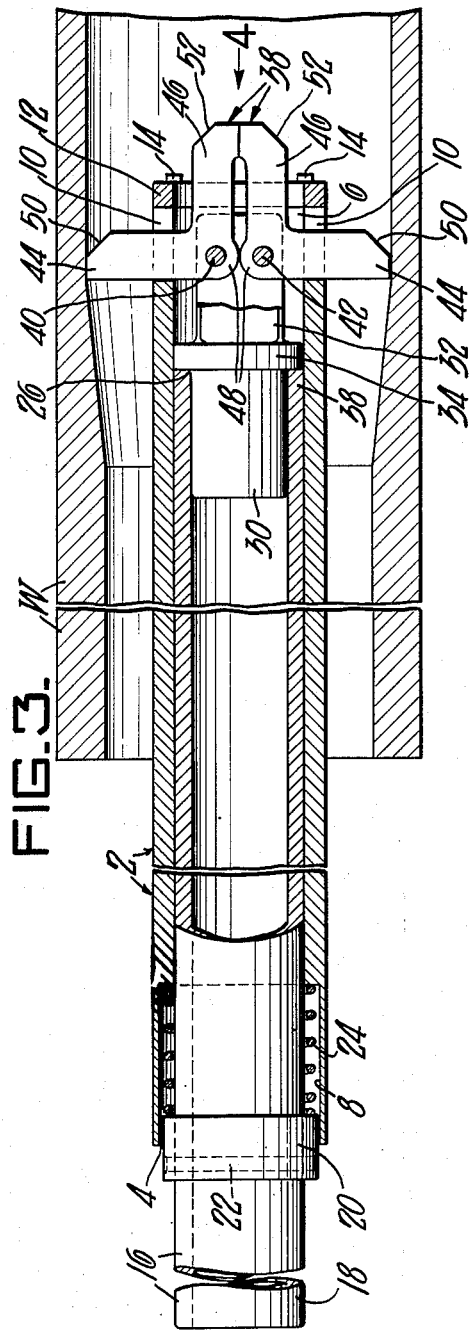

Patented Jan. 5, 1954

2,664,637

UNITED STATES PATENT OFFICE 2,664,637

GAUGE FOR INTERNAL UPSETS

Anthony M. Cataldo, Ellwood City, Pa., assignor to United States Steel Corporation, a corporation of New Jersey Application January 4, 1951, Serial No. 204,345

6 Claims. (Cl. 33—125)

The present invention relates to measuring apparatus and more particularly to a measuring gauge especially suitable for determining the extent of internal upsets in upset tubular products such as pipe and the like.

Prior to my invention, the length of an internal upset in an upset pipe was usually determined by inserting a rule into the pipe and then measuring the upset portion by visual examination. This method was not completely satisfactory, particularly in the case of smaller tube sizes, due to the poor conditions of visibility inside the tube. In the manufacture of upset pipe and similar tubular products it is extremely important that the length of the internal upset be measured accurately since this type of pipe is generally ordered according to specifications which include maximum and minimum limits on the length of the internal upset. Variations greater than the specified limits cause machining difficulties during subsequent manufacturing operations on the upset tube.

It is accordingly an object of my invention to provide an apparatus for measuring the length of an internal upset in a pipe or tube whereby such operation may be accomplished rapidly and accurately by mechanical means not dependent upon visual inspection within the pipe or tube.

This and other objects will be more apparent after referring to the following specification and attached drawings, in which:

Figure 1 is a plan view;

Figure 2 is a side elevation, partly in longitudinal section;

Figure 3 is a view similar to Figure 2 showing the gauge of the invention in operating position;

Figure 4 is an end view taken on the line arrow 4; and

Figure 5 is a side elevation of a modification.

Referring more particularly to the drawings, reference numeral 2 indicates a housing which may be in the shape of a tube having open ends 4 and 6. A short portion of the housing adjacent the end 4 is provided with an enlarged inside diameter to form a recess 8. A pair of opposed longitudinal slots 10 is provided in the opposite end 6 of the housing. A retaining ring 12 is removably affixed to the end 6 by means of set screws 14 to close the open ends of the slots 10. A tubular rod 16 having an outside diameter slightly less than the inside diameter of the housing is slidingly telescoped within the housing with one end 18 thereof projecting outwardly of the end 4. A collar 20 is adjustably mounted by means of a pin 22 around the projecting end 18 of the rod 16 adjacent the end 4 of the housing. A helical compression spring 24 is disposed around the portion of the rod 16 which lies substantially within the recess 8 with one end thereof bearing against the collar 20 and the other end bearing against the housing at the inner end of the recess 8. The helical spring 24 functions to constantly urge the rod 16 outwardly of the housing 2 through the end 4. A socket opening 26 in the inner end 28 of rod 16 is provided for receiving an insert portion 30 of a fork member 32. The fork member 32, which may be milled from bar stock, has an integral collar 34 disposed therearound between the insert portion 30 and a slotted end portion 36 and is shaped to provide a snug fit in the socket 26 of the rod 16. Two L-shaped toggle members 38 are pivotally mounted by means of pins 40 and 42 within the slotted portion 36 of the fork member 32. One leg 44 of each of the toggles 38 projects through one of the slots 10 while the other leg 46 projects through the open end 6 of the housing. A rounded heel portion 48 may be provided on each of the toggles 38 at the base of each of the legs 44 to facilitate reciprocal movement of the toggles. The toggles 38 which are mounted with the heel portions 48 in abutting relation turn freely on the pins 40 and 42, but are limited in their swing by the retaining ring 12 and the inner ends of the slots 10 as shown in Figure 2. Thus, longitudinal movement of rod 16 outwardly of housing 2, brought about by allowing spring 24 to expand, causes the legs 44 to move into aligned position normal to the longitudinal axis of the rod 16 and the legs 46 to extend in abutting relation with each other in planes parallel to the longitudinal axis of rod 16 as shown in Figure 3. Movement of rod 16 in the opposite direction, i. e. inwardly toward end 6 of the tube, causes retraction of the legs 44 and divergence of the legs 46 as shown in Figure 2. The ends of the legs 44 and 46 are beveled as at 50 and 52 in order to insure free movement of the apparatus through the upset portion of the pipe being measured while the apparatus is in the retracted position shown in Figure 2.

Figure 5 shows a modified arrangement for mounting the spring 24 on the rod 16. In this construction the housing 2 is not provided with an enlarged diameter portion such as that forming recess 8. The spring 24 is situated entirely outside of the housing with one end bearing against the collar 20ª and the other end bearing against the end 4 of the housing. Collar 20a is secured to rod 16 by means of set screw 22a.

In operation, the apparatus is held in collapsed position, as shown in Figure 2, while it is inserted in an upset pipe W for a distance somewhat greater than the anticipated length of the upset. Spring 24 is then permitted to expand to bring the legs 44 out to the maximum diameter which is greater than the inside diameter of the upset portion of the pipe and slightly less than the inside diameter of the remaining portion of the pipe, and the device is moved to the left until the legs 44 contact the beginning of the upset portion of the pipe as shown in Figure 3. A reading is then made on a longitudinal scale 54 inscribed on the outer surface of the housing 2. Scale 54 is divided into linear units such as inches to indicate the distance to the inner ends of the slots 10. The reading is taken at the point where the left end of the pipe crosses the scale. Thus, the reading taken indicates the length of the upset portion of the pipe. After the reading has been taken, the apparatus is moved to the right and collapsed as shown in Figure 2, after which it is removed from the pipe and inserted in the next pipe to be measured. A different set of toggle members 38 is provided for different sizes of pipe or tubing to be measured. The toggles may be readily changed by removing the retaining ring 12 and the pins 40 and 42.

While two embodiments of my invention have been shown and described, it will be apparent that other adaptations and modifications may be made without departing from the scope of the following claims.

I claim:

1. Apparatus for measuring the length of an internal upset in a tube comprising an open end tubular housing having a pair of opposed longitudinal slots in one end thereof, a rod slidingly telescoped within said housing with one end projecting from the end of said housing opposite said slotted end, a pair of substantially L-shaped members pivotally mounted on the forward end of said rod, one leg of each of said L-shaped members projecting through one of said slots and the other leg projecting from the end of said housing whereby longitudinal motion of the rod in one direction relative to the housing causes the slot projecting legs to abut the ends of said slots and move into aligned position normal to the longitudinal axis of the rod and the end projecting legs to move into abutting position parallel to the longitudinal axis of the rod to maintain the slot projecting legs in aligned position and motion of the rod in the opposite direction acts to move the end projecting legs away from each other out of abutting position to retract the slot projecting legs, and means for urging said rod outwardly of said housing, said apparatus characterized by said housing having an enlarged inside diameter recess portion adjacent the end thereof opposite said slotted end and said rod-urging means including bearing means on the projecting portion of said rod, and a helical compression spring mounted around the portion of said rod disposed substantially within the recess portion of said housing with one end abutting against said bearing means and the other end bearing against the inner end of said recess.

2. Apparatus for measuring the length of an internal upset in a tube comprising an open end tubular housing having a pair of opposed longitudinal slots in one end, said slots each having one open outer end, a rod slidably telescoped within said housing with one end projecting from the end of said housing opposite said slotted end, a forked member disposed on the end of said rod opposite the projecting end thereof, a pair of substantially L-shaped members pivotally mounted within said forked member, one leg of each of said L-shaped members projecting through one of said slots and the other leg projecting through the open end of said housing whereby longitudinal motion of the rod in one direction relative to the housing causes the slot projecting legs to abut the closed inner ends of said slots and move into aligned position normal to the longitudinal axis of the rod and motion of the rod in the opposite direction retracts the slot projecting legs, and a retaining ring removably attached to the slotted end of said housing for closing the open ends of said slots, means for urging said rod outwardly of said housing, said means including a helical compression spring disposed on said rod adjacent its projecting end, and bearing means for one end of the spring on the rod intermediate its projecting end and the spring, and the other end of said spring bearing against said housing whereby outward motion of the rod relative to the housing is effected.

3. Apparatus for measuring the length of an internal upset in a tube comprising an open end tubular housing having a pair of opposed longitudinal slots in one end, said slots each having one open outer end, an enlarged inside diameter recess portion adjacent the end thereof opposite said slotted end, a rod slidably telescoped within said housing with one end projecting from the end of said housing opposite said slotted end, a forked member disposed on the end of said rod opposite said projecting end, a pair of substantially L-shaped members pivotally mounted within said forked member, one leg of each of said L-shaped members projecting through one of said slots and the other leg projecting through the open end of said housing whereby longitudinal motion of the rod in one direction relative to the housing causes the slot projecting legs to abut the closed inner ends of said slots and move into aligned position normal to the longitudinal axis of the rod and motion of the rod in the opposite direction retracts the slot projecting legs, a retaining ring removably attached to the slotted end of said housing for closing the open ends of said slots, and means for urging said rod outwardly of said housing, said means including bearing means on the projecting portion of said rod, and a helical compression spring mounted around the portion of said rod disposed substantially within the recess portion of said housing with one end abutting against said bearing means and the other end bearing against the inner end of said recess.

4. Apparatus for measuring the length of an internal upset in a tube comprising an elongated supporting member, an elongated bar mounted for slidable movement on said supporting member, two pairs of spaced abutments on one end of said supporting member disposed transversely of said bar, a pair of substantially L-shaped members pivotally mounted on one end of said bar, one leg of each of said L-shaped members projecting at an angle to the longitudinal axis of said bar between each of said pairs of abutments and the other leg of each of said L-shaped members projecting from the end of said bar whereby longitudinal motion of said bar in one direction relative to said supporting member causes said first named projecting legs to move into aligned position normal to the longitudinal axis of the bar and said end projecting legs to move into position abutting each other parallel to the longitudinal axis of the bar to maintain said first named legs in aligned position, and motion of the bar in the opposite direction acts to move said end projecting legs away from each other and said first named legs to retracted position, and means on the end of said bar opposite said L-shaped members for urging said bar in the direction away from said abutments.

5. Apparatus for measuring the length of an internal upset in a tube comprising an open end tubular housing having a pair of opposed longitudinal slots in one end thereof, a rod slidingly telescoped within said housing with one end projecting from the end of said housing opposite said slotted end, a pair of substantially L-shaped members pivotally mounted on the forward end of said rod, one leg of each of said L-shaped members projecting through one of said slots and the other leg projecting from the end of said housing whereby longitudinal motion of the rod in one direction relative to the housing causes the slot projecting legs to abut the ends of said slots and move into aligned position normal to the longitudinal axis of the rod and the end projecting legs to move into position abutting each other parallel to the longitudinal axis of the rod to maintain the slot projecting legs in aligned position, and motion of the rod in the opposite direction acts to move the end projecting legs away from each other out of abutting position to retract the slot projecting legs, and means for urging said rod outwardly of said housing.

6. Apparatus for measuring as defined in claim 5 characterized by a longitudinal scale on the outside surface of said housing divided into units indicating the distance from the scale to the slotted end of said housing.

ANTHONY M. CATALDO.

References Cited in the file of this patent

UNITED STATES PATENTS

| Number | Name | Date |
|---|---|---|
| 836,340 | Pinkney | Nov. 20, 1906 |
| 1,805,343 | Robbins | May 12, 1931 |
| 2,470,498 | Lankford | May 17, 1949 |